(12) United States Patent
Kim et al.

(10) Patent No.: US 10,476,430 B2
(45) Date of Patent: Nov. 12, 2019

(54) SOLAR CELL MODULE AND ERROR DETECTOR FOR SOLAR CELL MODULES

(71) Applicant: LG ELECTRONICS INC., Seoul (KR)

(72) Inventors: Myonghwan Kim, Seoul (KR); Yunsu Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 351 days.

(21) Appl. No.: 15/251,660

(22) Filed: Aug. 30, 2016

(65) Prior Publication Data
US 2017/0063303 A1  Mar. 2, 2017

(30) Foreign Application Priority Data

Aug. 31, 2015 (KR) .................. 10-2015-0122847

(51) Int. Cl.
*H02S 50/00* (2014.01)
*H02S 40/34* (2014.01)

(52) U.S. Cl.
CPC .............. *H02S 50/00* (2013.01); *H02S 40/34* (2014.12)

(58) Field of Classification Search
CPC .................................. H02S 50/00; H02S 40/34
See application file for complete search history.

(56) References Cited

U.S. PATENT DOCUMENTS

| | | | |
|---|---|---|---|
| 2010/0043869 A1 | 2/2010 | Bennett et al. | |
| 2010/0147364 A1* | 6/2010 | Gonzalez | H01L 31/02021 136/251 |
| 2011/0083733 A1* | 4/2011 | Marroquin | H05K 7/10 136/256 |
| 2012/0325288 A1 | 12/2012 | Jang et al. | |
| 2014/0053892 A1* | 2/2014 | Seol | H02S 50/00 136/251 |
| 2014/0162476 A1* | 6/2014 | Deng | H01R 43/18 439/76.1 |

FOREIGN PATENT DOCUMENTS

| | | |
|---|---|---|
| CN | 103430324 A | 12/2013 |
| CN | 103608542 A | 2/2014 |
| JP | 9-148613 A | 6/1997 |
| JP | 11-40838 A | 2/1999 |
| JP | 11-330521 A | 11/1999 |
| JP | 2005-116834 A | 4/2005 |
| JP | 2010-98078 A | 4/2010 |
| JP | 2010098078 A * | 4/2010 |

(Continued)

OTHER PUBLICATIONS

Hiromi Ogi, JP 2010098078 A, English Machine Translation, Apr. 2010.*

(Continued)

*Primary Examiner* — Tae-Sik Kang
(74) *Attorney, Agent, or Firm* — Birch, Stewart, Kolasch & Birch, LLP

(57) ABSTRACT

Disclosed herein is a solar cell module. The solar cell module includes a solar cell panel, a distribution box located on the rear surface of the solar cell panel and including wiring connected to the solar cell panel, and a light source configured to emit light to the front surface of the solar cell panel through the solar cell panel, if an error signal is detected.

18 Claims, 15 Drawing Sheets

(56) References Cited

FOREIGN PATENT DOCUMENTS

| JP | 2012-94751 A | 5/2012 |
|----|---|---|
| KR | 10-2012-0140418 A | 12/2012 |
| KR | 10-1255105 B1 | 4/2013 |
| WO | WO 2012/171844 A1 | 12/2012 |

OTHER PUBLICATIONS

"Installation and Service Manual", Tunwall Radio, Mar. 2010, [online], [retrieved on Nov. 14, 2018]. Retrieved from the Internet<URL: file:///C:/Users/tkang/Downloads/Tunwall%20Radio%20TRC-2%20Manual%20(1).pdf>.*

* cited by examiner

SOLAR CELL MODULE AND ERROR DETECTOR FOR SOLAR CELL MODULES

CROSS-REFERENCE TO RELATED APPLICATION

This application claims the priority benefit of Korean Patent Application No. 10-2015-0122847, filed on Aug. 31, 2015 in the Korean Intellectual Property Office, the disclosure of which is incorporated herein by reference.

BACKGROUND OF THE INVENTION

1. Field of the Invention

The present invention relates to a solar cell module and an error detector for solar cell modules and, more particularly, to a solar cell module having an improved structure and an error detector for solar cell modules usable therein.

2. Description of the Related Art

Recently, as exhaustion of conventional energy sources, such as oil and coal, is expected, interest on alternative energy to be substituted for such energy increases. Thereamong, solar cells are spotlighted as a next generation battery which converts solar energy into electric energy.

Such solar cells are packaged and provided with a distribution box, i.e., are manufactured as a solar cell module. After such a solar cell module is installed, the operating state of the solar cell module may be confirmed using a separate communication unit, such as a web or an application, in a state in which the solar cell module is connected to a gateway. Since it is difficult for the solar cell module to autonomously recognize the operating state thereof, the solar cell module may not be efficiently managed.

SUMMARY OF THE INVENTION

An object of the present invention is to provide a solar cell module which may autonomously easily confirm the operating state thereof after installation of the solar cell module, and an error detector for solar cell modules usable in the solar cell module.

The objects of the present invention are not limited to the above-mentioned objects and other objects that have not been mentioned above will become evident to those skilled in the art from the following description.

To achieve the above objects, there is provided a solar cell module according to an exemplary embodiment of the present invention, including a solar cell panel, a distribution box located on the rear surface of the solar cell panel and including wiring connected to the solar cell panel, and a light source configured to emit light to the front surface of the solar cell panel through the solar cell panel, if an error signal is detected, wherein at least a part of the distribution box located between the solar cell panel and the light source constitutes a light transmitting area.

To achieve the above objects, there is provided an error detector for solar cell modules according to an exemplary embodiment of the present invention, used in a solar cell module having a solar cell panel, a distribution box located on the rear surface of the solar cell panel and including wiring connected to the solar cell panel, and a light source configured to emit light to the front surface of the solar cell panel through the solar cell panel, if an error signal is detected, the error detector including an optical sensor configured to detect an optical signal of the light source at the front surface of the solar cell panel and then to convert the optical signal into an electrical signal, a controller configured to receive the electrical signal and then to convert the electrical signal into a control signal, and a display unit configured to display an error signal according to the control signal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EMBODIMENTS

Figure 1:
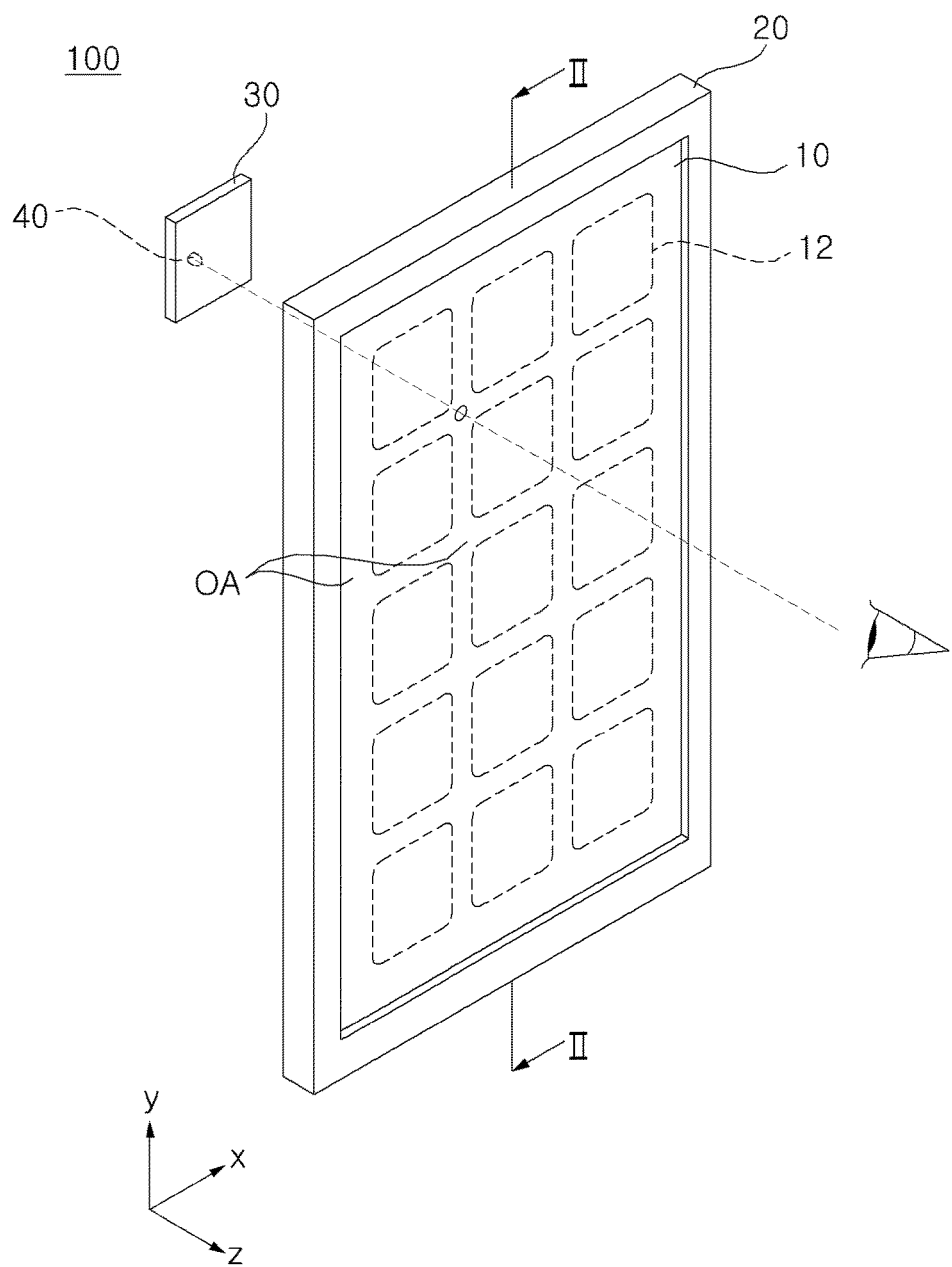
FIG. 1 is a schematic perspective view illustrating a solar cell module in accordance with one embodiment of the present invention.

Hereinafter, embodiments of the present invention will be described in detail with reference to the accompanying drawings. While the invention will be described in conjunction with exemplary embodiments, it will be understood that the present description is not intended to limit the invention to the exemplary embodiments.

In the drawings, in order to clearly and briefly describe the invention, parts which are not related to the description will be omitted, and the same reference numbers will be used throughout the drawings to refer to the same or like parts. Further, in order to more clearly describe the invention, thicknesses, areas, etc. of elements are enlarged or reduced and thus the thicknesses, areas, etc. of the elements are not limited to the drawings.

In the following description of the embodiments, the term "including" will be interpreted as indicating the presence of other elements, unless stated otherwise, and does not exclude presence of the corresponding elements. In addition, it will be understood that when an element, such as a layer, a film, a region or a plate, is referred to as being "on" another element, it can be directly on the element, and one or more intervening elements may also be present therebetween. It will be understood that when an element, such as a layer, a film, a region or a plate, is referred to as being "directly on" another element, no intervening elements may be present therebetween.

Hereinafter, a solar cell module and an error detector for solar cell modules usable therein in accordance with one embodiment of the present invention will be described in detail with reference to the accompanying drawings.

Figure 2:
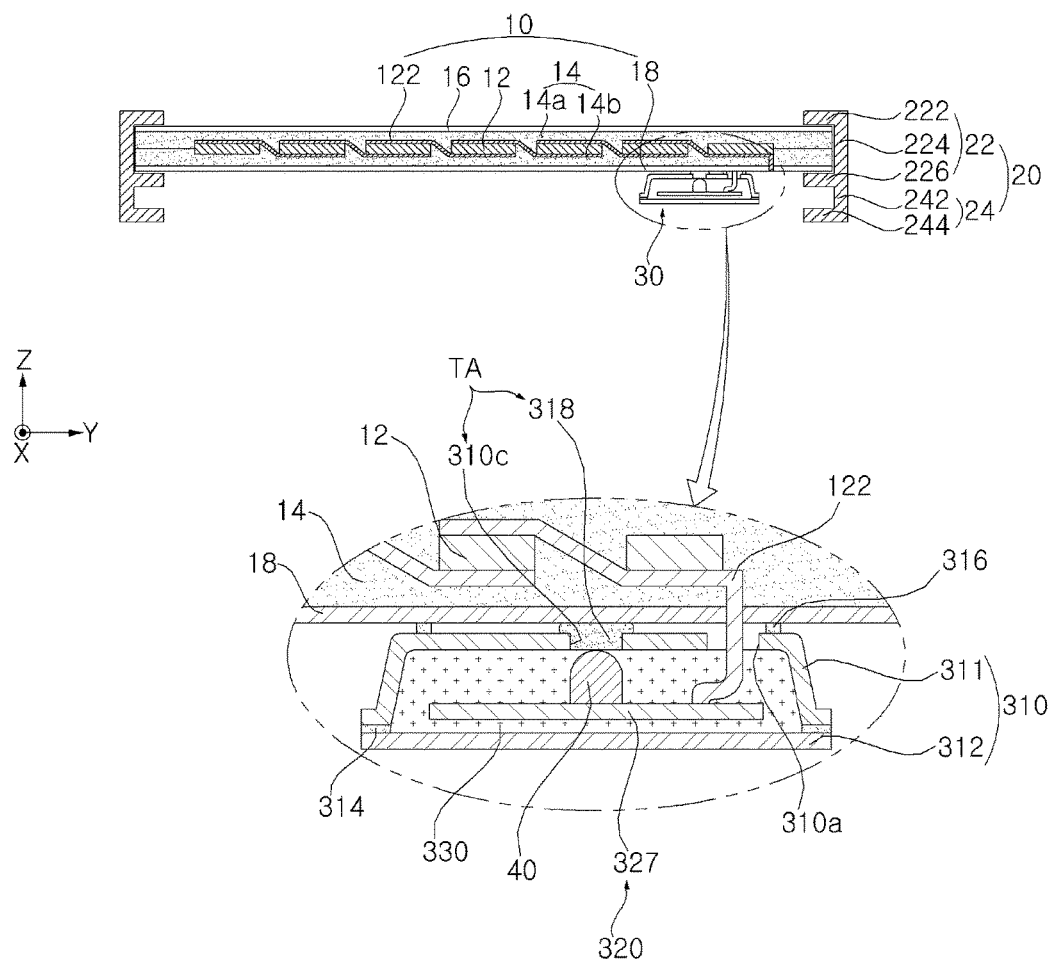
FIG. 2 is a schematic cross-sectional view taken along line II-II of FIG. 1.
Figure 3:
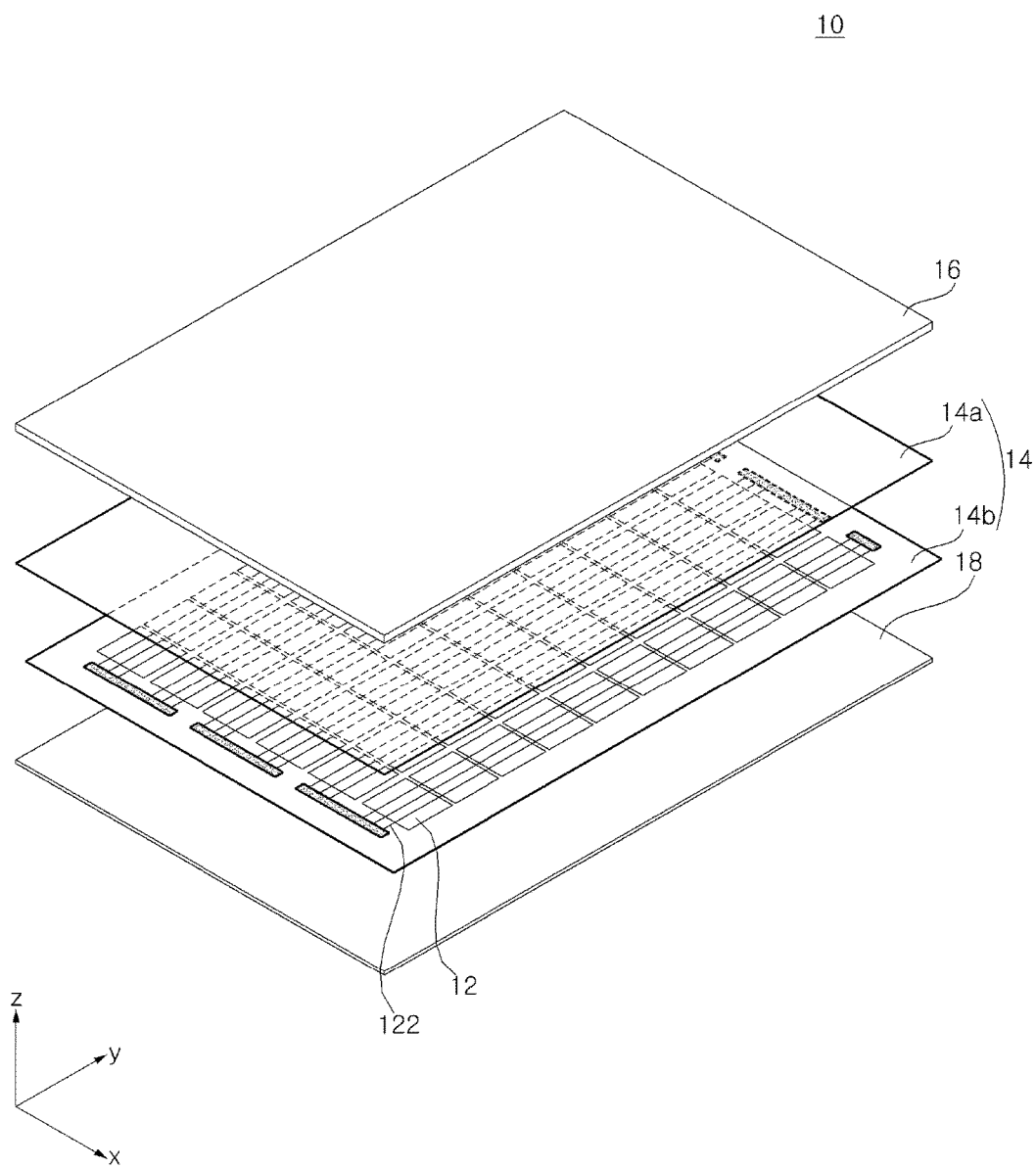
FIG. 3 is an exploded perspective view of a solar cell panel included in the solar cell module shown in FIG. 1.

FIG. 1 is a schematic perspective view illustrating a solar cell module in accordance with one embodiment of the present invention, FIG. 2 is a schematic cross-sectional view taken along line II-II of FIG. 1, and FIG. 3 is an exploded perspective view of a solar cell panel included in the solar cell module shown in FIG. 1.

With reference to FIGS. 1 to 3, a solar cell module 100 in accordance with this embodiment includes a solar cell panel 10 including solar cells 12, and a distribution box 30 mounted on the solar cell panel 10 and connected to the solar cell panel 10. The solar cell module 100 may further include a frame 20 to fix the edge portion of the solar cell panel 10 and an adhesive member located between the solar cell panel 10 and the frame 20 to seal the solar cell panel 10 and the frame 20 and to adhere the solar cell panel 10 and the frame 20 to each other. For the purpose of brief and clear illustration, the adhesive member is not shown in the drawings.

The solar cell panel 10 includes at least one solar cell 12. Further, the solar cell panel 10 may include sealing layers 14 to surround and seal the solar cells 12, a front substrate 16 disposed on one surface of the sealing layers 14 above the front surfaces of the solar cells 12, and a rear substrate 18 disposed on the other surface of the sealing layers 14 below the rear surfaces of the solar cells 12.

For example, the solar cell 12 may include a semiconductor substrate (for example, a single crystal semiconductor substrate, more particularly, a single crystal silicon wafer), first and second conductivity-type regions formed in or on the semiconductor substrate and having opposite conductivity-types, and first and second electrodes connected to the first and second conductivity-type regions. Here, one of the first and second conductivity-type regions may have a p-type and the other of the first and second conductivity-type regions may have an n-type. Further, the first and second conductivity-type regions may be provided as doping regions formed by doping parts of the semiconductor substrate with dopants or be provided as semiconductor layers separately formed on the semiconductor substrate and doped with dopants. A plurality of solar cells 12 is provided, and a first electrode of a solar cell 12 and a second electrode of a neighboring solar cell 12 are connected by a ribbon 122 so that a plurality of solar cells 12 may be arranged in a row and thus form a solar cell string. The solar cell string may be connected to the distribution box 30 located on the rear surface of the solar cell panel 10 by the ribbons 122. Various known structures may be applied as a structure of the solar cells 12, a connection structure of the solar cells 12, a connection structure between the solar cell panel 10 and the distribution box 30, etc.

As described above, this embodiment exemplarily described silicon semiconductor solar cells as the solar cells 12. However, the present invention is not limited thereto and solar cells having various structures, such as thin film solar cells, dye-sensitized solar cells, tandem solar cells, compound semiconductor solar cells, etc., may be used as the solar cells 12. Although this embodiment describes a plurality of solar cells 12 as being provided so as to form an outer area OA between the solar cells 12 located at the outermost region and the edge of the solar cell panel 10 and between the neighboring solar cells 12, only one solar cell 12 may be provided so as to form an outer area between the solar cell 12 and the edge of the solar cell panel 10.

The sealing layers 14 may include a first sealing layer 14a located on the front surfaces of the solar cells 12 connected by wiring 142 and a second sealing layer 14b located on the rear surfaces of the solar cells 12. The first sealing layer 14a and the second sealing layer 14b prevent inflow of moisture and oxygen and chemically bond respective elements of the solar cell panel 10. The first sealing layer 14a and the second sealing layer 14b may be formed of an insulating material having light transmittance and adhesiveness. For example, as the first sealing layer 14a and the second sealing layer 14b, an ethylene-vinyl acetate (EVA) copolymer resin, polyvinyl butyral, a silicone resin, an ester-based resin, an olefin-based resin, etc. may be used. The rear substrate 18, the second sealing layer 14b, the solar cells 12, the first sealing layer 14a and the front substrate 16 are integrated by a lamination process using the first and second sealing layers 14a and 14b, thus constituting the solar cell panel 10.

The front substrate 16 is located on the first sealing layer 14a and forms the front surface of the solar cell panel 10, and the rear substrate 18 is located on the second sealing layer 14b and forms the rear surface of the solar cell panel 10. The front substrate 16 and the rear substrate 18 may be formed of an insulating material which may protect the solar cells 12 from external impact, moisture, ultraviolet light, etc. Further, the front substrate 16 may be formed of a light transmitting material, and the rear substrate 18 may be formed of a sheet including a light transmitting material, a light non-transmitting material or a reflective material. For example, the front substrate 16 may employ a glass substrate, and the rear substrate 18 may have a Tedlar/PET/Tedlar structure or include a poly vinylidene fluoride (PVDF) resin layer formed on at least one surface of a base film (for example, polyethylene terephthalate (PET)).

However, the present invention is not limited thereto. Accordingly, the first and second sealing layers 14a and 14b, the front substrate 16 or the rear substrate 18 may include various materials and have various types, in addition to the above description. For example, the front substrate 16 or the rear substrate 18 may be formed as various types (for example, a substrate, a film, a sheet, etc.) or include various materials.

In order to stably fix the above-described solar cell panel 10 including a plurality of layers, the frame 20 to which the edge of the solar cell panel 10 is fixed may be provided. Although the drawings illustrate the entirety of the edge of the solar cell panel 10 as being fixed to the frame 20, the present invention is not limited thereto. Therefore, some parts of the edge of the solar cell panel 10 may be fixed to the frame 20 and various modifications are possible.

In accordance with this embodiment, the frame 20 may include a panel insertion part 22, into which at least a part of the solar cell panel 10 is inserted, and an extension part 24 extending outwards from the panel insertion part 22.

In more detail, in the panel insertion part 22, a front part 222 located on the front surface of the solar cell panel 10, a side part 224 located on the side surface of the solar cell panel 10, and a rear part 226 located on the rear surface of the solar cell panel 10 may be connected to form the panel insertion part 22, in which the edge of the solar cell panel 10 is located. For example, the panel insertion part 22 may be bent twice and thus have a C-shaped cross-section or a U-shaped cross-section so as to locate the edge of the solar cell panel therein. However, the present invention is not limited thereto and any one or some of the front part 222, the side part 224 and the rear part 226 may be omitted. In addition, various modifications are possible.

The extension part 24 extending rearwards from the panel insertion part 22 may include a first part 242 extending rearwards from the panel insertion part 22 and formed parallel to the side part 224 (or formed coplanar with the side part 224), and a second part 244 bent and extending from the first part 242 and spaced from the rear surface of the solar cell panel 10 or the rear part 225 at a designated interval. The second part 244 may be formed parallel to or be inclined from the rear surface of the solar cell panel 10 or the rear part 226. Thereby, the extension part 24 may be bent once and thus have a L-shaped cross-section so as to form a space between the extension part 24 and the rear part 226.

Such an extension part 24 may increase strength of the frame 20 and be connected to a part fixed to a stand, a support or a bottom surface, and holes to which fastening members (not shown) for fastening to the stand, the support or the bottom surface are fastened may be formed on the extension part 24. The fastening members, etc. are fastened to the second part 244 spaced from the solar cell panel 10 and may thus protect the solar cell panel 10 from damage when the solar cell module 100 is installed using the fastening members.

In order to stably fix the fastening members, the second part 244 may have an area which is equal to or greater than the area of the rear part 226 (i.e., have a width which is equal to or greater than the width of the rear part 226). Further, the fastening members may employ various known structures. The present invention is not limited thereto and the extension part 24 may have various shapes, in addition to the above-described shape.

The frame 20 may be fixed to the solar cell panel 10 through various methods. For example, an elastic part (for example, an elastic tape) may be formed at the edge of the solar cell panel 10 and the solar cell panel 10 may be inserted into the panel insertion part 22 using such an elastic part. However, the present invention is not limited thereto and various modifications, such as assembly of parts constituting the frame 20 at the edge of the solar cell panel 10, are possible.

The distribution box 30 including wiring connected to the solar cell panel 10 may be provided on the rear surface of the solar cell panel 10. This embodiment exemplarily describes the distribution box 30 as having a structure in which at least a part of a conventional junction box and at least a part of an inverter are integrated. The distribution box 30 may be referred to as an integrated inverter, a junction box-integrated inverter, a bypass diode-integrated inverter, an integrated junction box, or an inverter-integrated junction box. Such a distribution box 30 will be described in more detail with reference to FIG. 4 together with FIGS. 1 to 3.

Figure 4:
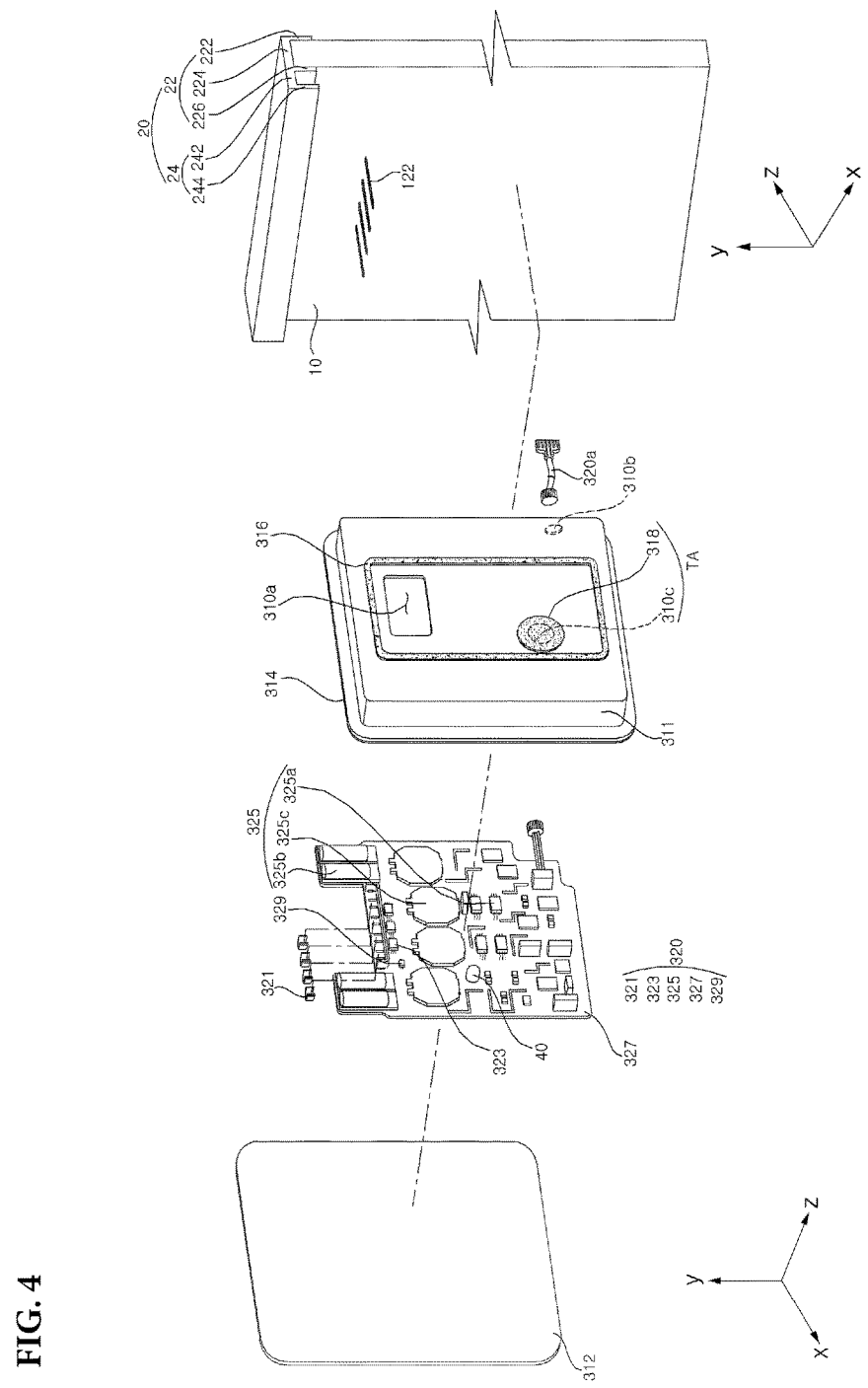
FIG. 4 is an exploded perspective view schematically illustrating a distribution box and a part of the solar cell panel shown in FIG. 1.

FIG. 4 is an exploded perspective view schematically illustrating the distribution box 30 and a part of the solar cell panel 10 shown in FIG. 1.

With reference to FIGS. 1 to 4, the distribution box 30 is provided with a light source 40 which emits light to the front surface of the solar cell panel 10 through the solar cell panel 10 if an error signal from the distribution box 30 is detected. Further, at least a part of the distribution box located between the solar cell panel 10 and the light source 40 forms a light transmitting area TA having a light transmitting property. In the specification, the light transmitting property includes transparency, translucency, and a degree of opacity at which presence and absence of light may be discriminated. Thus, a light non-transmitting property means that presence and absence of light may not be discriminated.

In more detail, the distribution box 30 may include a case 310 having an inner receipt space formed therein, and a circuit unit 320 located within the case 310 and including various wiring parts for electrical connection with the solar cell panel 10. In this embodiment, at least a part of the light source 40 may be located within the case 310. Therefore, the light source 40 is protected by the case 310 and thus a separate structure to protect the light source 40 may be omitted. Further, by forming the light transmitting area TA at a part of the distribution box 30 located between the light source 40 and the solar cell panel 10, light emitted from the light source 40 may pass through the distribution box 30 and the solar cell panel 10 and be recognized at the front surface of the solar cell panel 10. That is, the light source 40 may be stably disposed using a simple structure so as to emit light recognizable at the front surface of the solar cell panel 10.

Differently, if the light source 40 is located at the outside of the case 310, the light source 40 may be easily damaged by external impact, moisture, etc., or be separated from the case 310. Further, if the entirety of the light source 40 is located between solar cell panel 10 and the distribution box 30 at the outside of the case 310, it is difficult to secure structural stability of the light source 40 and the thickness of the solar cell module 100 may be increased. Otherwise, if the light source 40 is located on the front surface of the solar cell panel 10, the light source 40 may be easily damaged or broken by rain, contaminants, external impact, etc. If, in order to prevent such problems, separate waterproof and damping structures, etc. are formed, the structure of the solar cell module 100 may be complicated and manufacturing costs of the solar cell module 100 may be increased.

The light source 40 may be fixed to the case 310 or to the inside of the case 310 while at least a part of the light source 40 is located within the case 310. For example, the light source 40 may be fixed to the circuit unit 320. If the light source 40 is fixed to the circuit unit 320, the light source 40 may be stably fixed and be electrically connected to wiring of the circuit unit 320 so as to simplify a structure for driving the light source 40 (i.e., turning on/off the light source 40). Particularly, in this embodiment, the circuit unit 320 may be provided with a circuit board 320 (for example, a printed circuit board), and the light source 40 may be fixed to the circuit board 320. This will be described later in more detail.

However, the present invention is not limited thereto and the light source 40 may be fixed to various positions. For example, the light source 40 may be fixed to the case 310 or fixed between the case 310 and the circuit unit 320, and various other modifications are possible.

The case 310 may have various structures which are provided with an inner receipt space to protect the circuit unit 320, the light source 40, etc. This embodiment exemplarily describes the case 310 as including a first case part 311 and a second case part 312 bonded to each other to form the case 310. Therefore, in a state in which the first case part 311 and the second case part 312 are separated from each other, the circuit unit 320 and the light source 40 may be easily inserted into or taken out of the inner receipt space of the case 310 and, in a state in which the first case part 311 and the second case part 312 are combined with each other, the circuit unit 320 and the light source 40 may be stably received in the inner receipt space of the case 310. However, the present invention is not limited thereto and the structure of the case 310 may be variously modified.

For example, the first case part 311 may have a bottom surface located adjacent to the rear surface of the solar cell panel 10 and an inner receipt space formed therein, and the second case part 312 may have a flat shape so as to cover the inner receipt space. However, the present invention is not limited thereto. Therefore, the first case part 311 may have a bottom surface having a flat shape and located adjacent to the rear surface of the solar cell panel 10, and the second case part 312 may have an inner receipt space formed therein. The first case part 311 and the second case part 312 may be bonded to each other by a bonding member 314 which bonds the edges of the first and second case parts 311 and 312 to each other and seals the first and second case parts 311 and 312. The bonding member 314 may prevent external impurities, contaminants, etc. from being introduced into the case 310 and improve sealing characteristics and waterproofing. The bonding member 314 may employ various materials having bonding and/or sealing properties, for example, a sealant. However, the present invention is not limited thereto.

The case 310 may include various materials which may maintain the external shape and contour of the case 310 and protect various parts, articles, members, etc. located in the case 310. For example, the case 310 may be formed of various materials, such as, a resin, a metal, a surface-treated metal (or a coated metal), etc. If the case 310 is formed of an insulating material (for example, a resin), insulating characteristics of the case 310 may be improved and manufacturing costs of the case 310 may be reduced. Further, if the case 310 is formed of a metal, structural stability of the case 310 may be improved and the case 310 may be used for grounding. Here, if the case 310 is formed of a surface-treated metal (or a coated metal), a conductive material may be located at the inner region and an insulating material surrounding the conductive material may be located at the outer region. Thereby, the case 310 may have improved corrosion resistance and external appearance by the insulating material and apply the metal material located at the inner region as a ground structure. For example, the case 310 may be formed of an anodized metal (for example, anodized aluminum). Further, when surface treatment (for example, anodizing) is carried out, the color of the case 310 may be adjusted along with surface treatment, thereby further improving the external appearance of the case 310. For example, the case 310 may have a color, such as black, brown, or silver.

As described above, the case 310 may be formed of a material having a light transmitting property or a material having no light transmitting property according to constituent materials. If the case 310 is formed of a material having no light transmitting property, at least the first case part 311 corresponding to the position of the light source 40 may have a light transmitting property. The reason for this is that the first case part 311 is located at a region which may block light from the light source 40, between the light source 40 and the solar cell panel 10. This will be described in more detail when the light transmitting area TA is described after description of the circuit unit 320.

The circuit unit 320 located within the case 310 may include at least one of terminals 321 to which the ribbons 122 extending from the solar cells 12 or the solar cell panel 10 and passing through a first opening (or a first through hole) 310 are connected, bypass diodes 323 located between the terminals 321 and inverter members 325, the inverter members 325 including DC-AC inverters 325a, and a circuit board 327 on which the terminals 321, the bypass diodes 323, the inverter members 325, etc. are located. The circuit unit 320 includes a controller 329 which receives state information from the respective elements of the circuit unit 320 to control the respective elements and controls operation of the light source 40 if there is an error signal. Various known elements may be applied as the controller 329 and, for example, a micro-controller unit (MCU) may be used as the controller 329. The terminals 321, the bypass diodes 323, the inverter members 325 and the controller 329 are connected by a circuit pattern formed on the circuit substrate 327.

A space of the inside of the case 310, at which the circuit unit 320 is not located, may be filled with a potting member (or an insulating material) 330 or an insulating unit, an insulating case, etc. are located within the space, thereby being capable of improving air-tightness of the inside of the distribution box 30 and preventing undesired short-circuit of the circuit unit 320. However, the present invention is not limited thereto and the potting member 330, an insulating material, the insulating unit, the insulating case, etc. may not be located in the distribution box 30.

For example, in this embodiment, the terminals 321, the bypass diodes 323, the inverter members 325 and the controller 329 are formed together on the circuit board 327 having a circuit pattern (or circuits or wiring). Thereby, it may be understood that the terminals 321, the bypass diodes 323, the inverter members 325 and the controller 329 are integrated by the circuit board 327. Further, the potting member 330 may be located so as to cover or surround the circuit board 327, and it may be understood that the bypass diodes 323, the inverter members 325 and the controller 329 are integrated with the circuit board 327 by the potting member 330. Further, the circuit substrate 327 on which the terminals 321, the bypass diodes 323, the inverter members 325 and the controller 329 are formed may be located within the same case 310. Thereby, it may be understood that the terminals 321, the bypass diodes 323, the inverter members 325, the controller 329 and the circuit board 327 may be integrated by the same case 310.

The inverter members 325 may include DC-AC inverters 325a to convert DC current into AC current, capacitors 325b to stably convert DC current into AC current, and DC-DC converters 325c.

The capacitors 325b store current having passed through the bypass diodes 323 and transmit current of a designated voltage to the DC-DC converters 325c. The DC-DC converters 325c convert current of the voltage received from the capacitors 325b into another DC voltage of a designated level. The DC-AC inverters 325a convert DC current or DC voltage received from the DC-DC converter 325c into AC current or AC voltage. Such AC current or AC voltage generated by the distribution box 30 is transmitted to the outside by an AC output cable 320a connected to the inverter members 325 and passing through a second opening (or a second through hole) 310b. For example, the AC current or AC voltage is connected to another solar cell module 100 or transmitted to an electric power network, an electric power system, etc. by AC output cable 320a.

In this embodiment, a plurality of DC-DC converters 325c may be provided. If a plurality of DC-DC converters 325c is provided, the thickness of the respective DC-DC converters 325c may be reduced, as compared to the case that one DC-DC converter 325c is provided, and thus the thickness of the distribution box 30 may be less than the height of the extension part 24. However, the present invention is not limited thereto and one DC-DC converter 325c may be provided.

Various known structures may be applied to the DC-AC inverters 325a, the capacitors 325b and the DC-DC converters 325c. In addition, various parts, such as a filter unit, a communication unit, etc., may be located on the circuit board 327.

In this embodiment, the AC output cable 320a is provided as an output cable output from the distribution box 30, in which the terminals 321 connected to the ribbons 122 and/or the bypass diodes 323 are located, and no DC output cable is provided. The reason for this is that the terminals 321 and/or the bypass diodes 323 and the inverter members 325 are integrated. Conventionally, DC voltage or DC current is withdrawn from a junction box, in which terminals and bypass diodes are located, and thus two DC output cables, i.e., a positive (+) output cable and a negative (−) output cable, are provided.

In this embodiment, both a structure for connection with the solar cell panel 10 and a structure for connection with the outside (for example, another solar cell module 100 or an electric power network) may be formed in the case 310. That is, the case 310 may be provided with the first opening 310a, through which the ribbons 122 pass, and the second opening 310b, through which one AC output cable 320a to transmit AC current (or AC voltage, current power or AC power) generated by the distribution box 30 passes. That is, the first opening 310a for connection with the solar cell panel 10 and the second opening 310b for the AC output cable 320a are formed in the same case 310. The reason for this is that the terminals 321 and/or the bypass diodes 323 and the inverter members 325 are integrated.

The above-described case 310 may be fixed to the rear surface of the solar cell panel 10 by an adhesive member 316. The adhesive member 316 surrounds the first opening 310a and forms a closed space therein so as to isolate the inner space of the adhesive member 316 from the outside. Therefore, the adhesive member 316 may prevent external substances, moisture, impurities, etc. from being introduced into the case 310 through the first opening 310a. Thereby, air-tight, sealing and waterproof properties of the case 310 may be improved.

Various materials having excellent adhesive properties and excellent sealing properties may be used as the adhesive member 316. For example, a sealant may be used as the adhesive member 316. However, the present invention is not limited thereto. Therefore, the adhesive member 316 may be a structure formed of a resin, a metal, etc., so as to attach the case 310 to the solar cell panel 10 by heat, i.e., various modifications of the adhesive member 316 are possible. Further, the case 310 and the solar cell panel 10 may be fixed to each other by other combination structures (for example, screw-combination, a latch structure and a packing structure). In addition, other various modifications are possible.

In this embodiment, the terminals 321, the bypass diodes 323, the inverter members 325 and the circuit board 327 may be located within one distribution box 30, thus being capable of simplifying an installation process of the distribution box 30 and simplifying the structure of the distribution box 30. Further, various state information of the solar cell module 100 may be displayed by the light source 40. However, the present invention is not limited thereto and the distribution box 30 may mean all configurations including at least one of the terminals 321, the bypass diodes 323, the inverter members 325 and the circuit board 327. For example, the distribution box 30 may separately include a junction box including the terminals 321 connected to the ribbons 122 of the solar cell panel 10 and/or the bypass diodes 323 and an inverter box including the inverter members 325, and at least one of the junction box and the inverter box may include the above-described light source 40 and the light-emitting part TA. Further/otherwise, the distribution box 30 may include a power optimizer, module-level power electronics (MLPE), etc., and at least one thereof may include the above-described light source 40 and the light-emitting part TA.

Next, the light source 40 and the light-emitting part TA will be described. In this embodiment, the light source 40 may be located on a surface of the circuit board 327 facing the solar cell panel 10. Thereby, light emitted from the light source 40 reaches the solar cell panel 10 along a short path and thus light transmission efficiency may be improved. Further, power, signals, etc. required by the light source 40 may be easily supplied by the circuit pattern included in the circuit board 327. For example, terminals 40 of the light source 40 may be electrically and physically connected to circuit wiring of the circuit board 327 by soldering, etc. Here, power separately supplied may be used or a part of power generated by the solar cell panel 10 may be used as power to drive the light source 40. However, the present invention is not limited thereto and the position of the light source 40 may be variously modified.

Here, the light source 40 is located at a position on a plane corresponding to a part of the solar cell panel 10 provided with no solar cells 12, i.e., the outer area OA corresponding to the edge of the solar cell panel 10 or a position between the neighboring solar cells 12. If the light source 40 is located at a position corresponding to the position of the solar cell 12, light emitted from the light source 40 is blocked by the solar cell 12 and may not be recognized at the front surface of the solar cell panel 10. Particularly, the light source 40 may be located at a position corresponding to the outer area OA between the neighboring solar cells 12 so as to be clearly seen from the solar cell panel 10. Since at least a part of the edge of the solar cell panel 10 is blocked by the frame 20, if the light source 40 is located at a position corresponding to the edge of the solar cell panel 10, it may be difficult to recognize light emitted from the light source 40.

However, the present invention is not limited thereto. That is, although the light source 40 is located at a position corresponding to the solar cell 12, if a part of light emitted from the light source 40 may reach the front surface of the solar cell panel 10 through the outer area OA, the light source 40 may be located at the position corresponding to the solar cell 12.

The light source 40 may emit light through various known structures and methods. For example, the light source 40 may include light emitting diodes (LEDs) which have a small volume and are economic and eco-friendly.

Here, at least a part of the distribution box 30 located between the light source 40 and the solar cell panel 10 serves as the light transmitting area TA. For example, in this embodiment, a through hole 310c is formed through a position of the case 310 of the distribution box 30 (in more detail, the bottom surface of the first case part 311) corresponding to the position of the light source 40. Thereby, light may pass through the through hole 310c regardless of whether or not the case 310 has a light transmitting property. Therefore, such a through hole 310c may constitute the light transmitting area TA.

If the light transmitting area TA is formed by the through hole 310c, the light transmitting area TA may be formed by a simple process of forming the through hole 310c. Since the through hole 310c transmits light at a high transmittance, light emitted from the light source 40 may be clearly recognized at the front surface of the solar cell panel 10. Particularly, if the case 310 is opaque, the through hole 310c allows light to pass through the case 310.

Here, the through hole 310c may be filled with a light transmitting material 318 (for example, a resin) so as not to lower air-tightness of the distribution box 30. The light transmitting material 318 may be formed by filling the inside of the through hole 310c with a material having fluidity and then solidifying the material by drying, hardening, etc.

Since the light transmitting material 318 is located between the light source 40 and the solar cell panel 10, the light transmitting material 318 may constitute a part of the light transmitting area TA. However, the light transmitting material 318 is not essential. Therefore, if the potting member 300, the insulating part, etc. are located within the case 310, filling of the inside of the through hole 310c with a separate material is not required. Otherwise, if the adhesive member 316 is formed to have a closed space surrounding the through hole 310c, as exemplarily shown in FIG. 4, filling of the inside of the through hole 310c with a separate material is not required. Further, although FIG. 4 exemplarily illustrates only the light transmitting material 318 as being located on the light source 40, both the potting member 330 and the light transmitting material 318 may be located on the light source 40 or only the potting member 330 without the light transmitting material 318 may be located on the light source 40. In this case, the potting member 330 has a light transmitting property and may thus constitute a part of the light transmitting area TA. Otherwise, a vacant space may be located between the light source 40 and the solar cell panel 10 and, in this case, the vacant space has a light transmitting property and may thus constitute a part of the light transmitting area TA.

Figure 5:
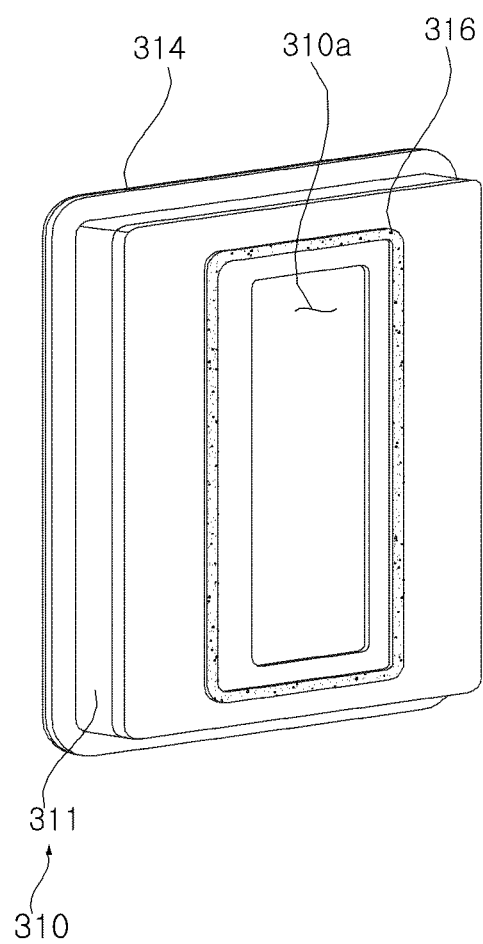
FIG. 5 is a perspective view of a first case part of a solar cell module in accordance with a modified embodiment of the present invention.

FIG. 4 exemplarily illustrates the through hole 310c corresponding to the light source 40 as being provided separately from the first opening 310a to pass the ribbons 122 therethrough. Therefore, the position of the light source 40 and the position of the ribbons 122 are separated from each other, obstruction of arrival of light to the front surface of the solar cell panel 10 by the ribbons 122 may be prevented. However, the present invention is not limited thereto and, as exemplarily shown in FIG. 5, no separate through hole 310c is formed and the first through hole 310a to pass the ribbons 122 therethrough may be used as the through hole 310c so that the light source 40 may be located within the first opening hole 310a. Thereby, it is not necessary to separately form a through hole 310c in the case 310 and thus the structure of the case 310 may be simplified. Further, no separate light transmitting material 318 may be provided. However, the present invention is not limited thereto and various modifications are possible.

This embodiment exemplarily describes the through hole 310c corresponding to the position of the light source 40 as constituting the light transmitting area TA. Thereby, the light transmitting area TA may be easily formed by forming a through hole 310c in a conventional case 310 (in more detail, a first case part 311 located between a circuit board 327 and a solar cell panel 10). However, the present invention is not limited thereto. Other embodiments will be described in detail later with reference to FIGS. 9 to 13.

Figure 6:
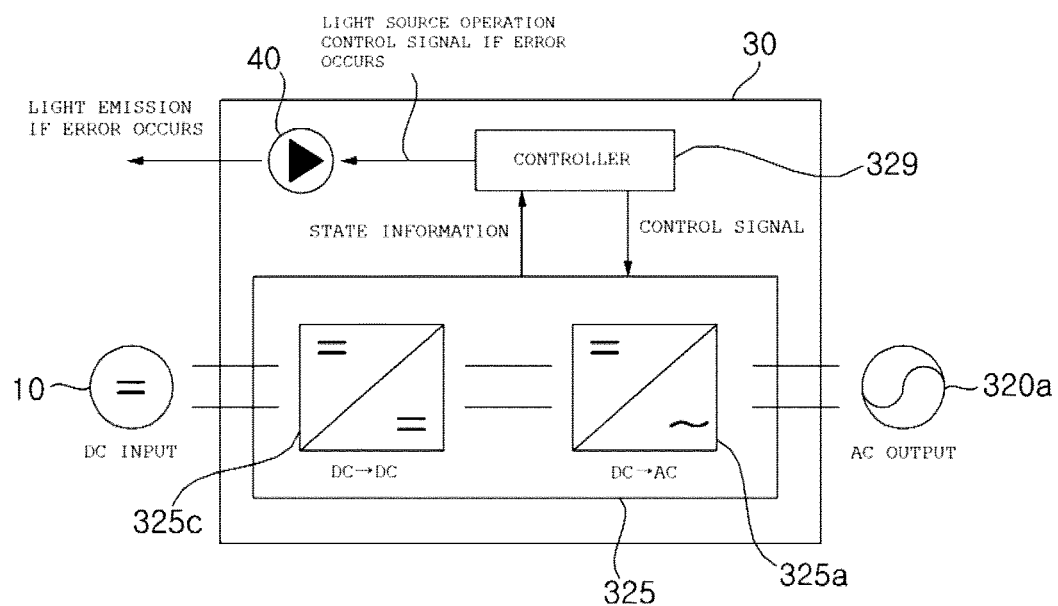
FIG. 6 is an exemplary circuit diagram of the distribution box and a light source in the solar cell module shown in FIG. 1.

Hereinafter, a principle of emitting light from the light source 40 if an error signal of the solar cell module 100 or the distribution box 30 is detected will be described in detail with reference to FIG. 6. FIG. 6 is an exemplary circuit diagram of the distribution box 30 and the light source 40 in the solar cell module shown in FIG. 1. For the purpose of clear and brief illustration in FIG. 6, the terminals 321, the bypass diodes 323 and the capacitors 325b are omitted and only parts to control the light source 40 will be described.

With reference to FIG. 6, DC current, DC voltage or DC power generated by the solar cell panel 10 is transmitted to the inverter members 325. The DC-DC converters 325c of the inverter members 325 convert DC current, DC voltage or DC power into DC current, DC voltage or DC power having a different value. The DC-AC inverters 325a of the inverter members 325 convert the DC current, DC voltage or DC power received from the DC-DC converters 325c into AC current, AC voltage or AC power. Such converted AC current, AC voltage or AC power is transmitted to the outside through the AC output cable 320a.

Here, the controller 329 receives state information from the inverter members 325 and transmits a signal to control the inverter members 325 based on the state information, thereby controlling the inverter members 325. If the controller 329 detects an error signal of the inverter members 325 (i.e., an error signal of the solar cell module 100), the controller 329 controls operation of the inverter members 325 based on the error signal, and transmits a light source operation control signal to the light source 40 and thus controls operation (for example, on/off) of the light source 40. Then, the light source 40 emits light to the front surface of the solar cell panel 10. Thereafter, a user or a manager may recognize light at the front surface of the solar cell panel 10 and thus sense that an error of the inverter members 325 or the solar cell panel 10 occurs.

The light source 40 may indicate whether or not operation of the solar cell module 100 (or the inverter members 325) is normal or abnormal through simple on/off of the light source 40. For example, the light source 40 may maintain the off state if the solar cell module 100 is normally operated, and the light source 40 may be turned on if the solar cell module 100 is abnormal. Otherwise, the light source 40 may provide light at different time intervals, with different colors, or at different intensities according to various operation errors of the solar cell module 100 and thus indicate which part of the solar cell module 100 is out of order.

Various kinds of errors of the solar cell module 100 may be displayed using the light source 40. For example, if a frequency of AC current output from the inverter members 325 is more rapidly changed than a set reference, if leakage current is higher than a set reference, if AC current output from the inverter members 325 is higher than a set reference, if DC current input to the inverter members 325 is higher than a set reference, if communication of a communication unit of the circuit unit 320 is not stable, if the inverter members 325 are not operated, if the temperature of the inverter members 325 is higher than a set reference, if AC voltage output from the inverter members 325 is higher or lower than a set reference, if a frequency of AC current output from the inverter members 325 is higher or lower than a set reference, and if DC voltage input to the inverter members 325 is higher or lower than a set reference, the light source 40 may emit light. In addition, other kinds of errors may be displayed through the light source 40.

In accordance with this embodiment, a user or a manager may recognize light emitted from the light source 40 and reaching the front surface of the solar cell panel 10 through the solar cell panel 10 and thus an abnormality or an operation error of the solar cell module 100 may be sensed. Otherwise, an abnormality or an operation error of the solar cell module 100 may be sensed using a separate error detector (200 in FIG. 7; hereinafter, being the same as above) which senses light reaching the front surface of the solar cell panel 10. As described above, in this embodiment, since the solar cell module 100 may autonomously recognize an error signal of the solar cell module 100, an error of the solar cell module 100 may be easily sensed and thus necessary measures may be taken. Therefore, management of the solar cell module 100 may be more efficiently carried out.

If the error detector 200 is used, the error detector 200 senses an optical signal from the light source 40, the time interval, color or intensity of which is minutely controlled, and may thus detect which abnormality or operation error occurs among various abnormalities or operation errors of the solar cell module 100 in more detail. Hereinafter, with reference to FIGS. 7 and 8 together with FIGS. 1 to 6, the error detector 200 usable in the solar cell module in accordance with this embodiment will be described in detail.

Figure 7:
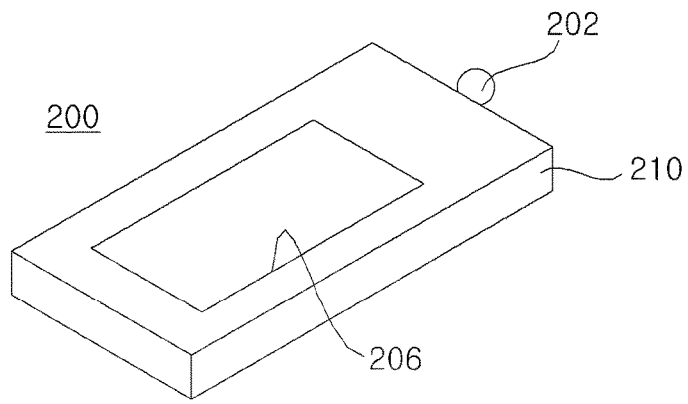
FIG. 7 is a perspective view of an error detector usable in a solar cell module in accordance with one embodiment of the present invention.
Figure 8:
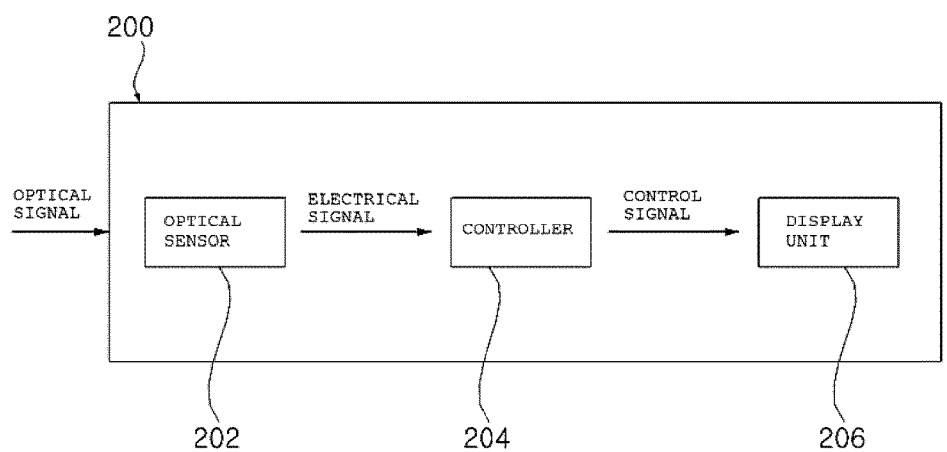
FIG. 8 is a schematic circuit diagram of the error detector shown in FIG. 7.

FIG. 7 is a perspective view of the error detector 200 usable in the solar cell module 100 in accordance with the embodiment of the present invention, and FIG. 8 is a schematic circuit diagram of the error detector 200 shown in FIG. 7.

With reference to FIGS. 7 and 8, the error detector 200 in accordance with this embodiment may include an optical sensor 202, a controller 204 and a display unit 206.

The optical sensor 202 recognizes light emitted from the light source 40 and reaching the front surface of the solar cell panel 10. Thereby, the optical sensor 202 receives an optical signal, converts the received optical signal into an electrical signal and then transmits the electrical signal to the controller 204. The optical sensor 202 may be located at one side end of a main body 210. By locating the side end of the main body 210 provided with the optical sensor 202 at the front surface of the solar cell panel 10, an optical signal may be accurately recognized. Known sensors having various structures may be applied as the optical sensor 202.

The controller 204 transmits a control signal, to display contents to be displayed through the display unit 206, to the display unit 206 based on the electrical signal received from the optical sensor 202. The controller 204 may be located within the main body 210.

The display unit 206 may be located on the broadest surface of the main body 210 and display an error signal. Here, the error signal displayed through the display unit 206 may indicate that there is an error signal or indicate which error signal is detected. Various known configurations may be applied to the display unit 206. For example, a liquid crystal display which displays an error signal as text, etc. may be applied. Otherwise, the display unit 206 may display a signal from the light source 40 through light intensity, light color, etc.

In the above-described error detector 200, the optical sensor 202 may recognize minute differences between on/off of the light source 40, the frequencies of lighting of the light source 40, the lighting time intervals of the light source 40, the colors of light emitted from the light source 40 and/or the intensities of light emitted from the light source 40, the display unit 206 may display an error signal based on the differences, and thus the detailed state of the solar cell module 100 may be clearly detected.

Hereinafter, solar cell modules in accordance with other embodiments of the present invention will be described in detail with reference to FIGS. 9 to 13. Some parts in these embodiments, which are substantially the same as or similar to those in the former embodiment, are denoted by the same reference numerals even though they are depicted in different drawings and a detailed description thereof will thus be omitted because it is considered to be unnecessary. Further, the former embodiment, modifications thereof, these embodiments and modifications thereof may be combined, without departing from the scope and spirit of the invention as disclosed in the accompanying claims.

Figure 9:
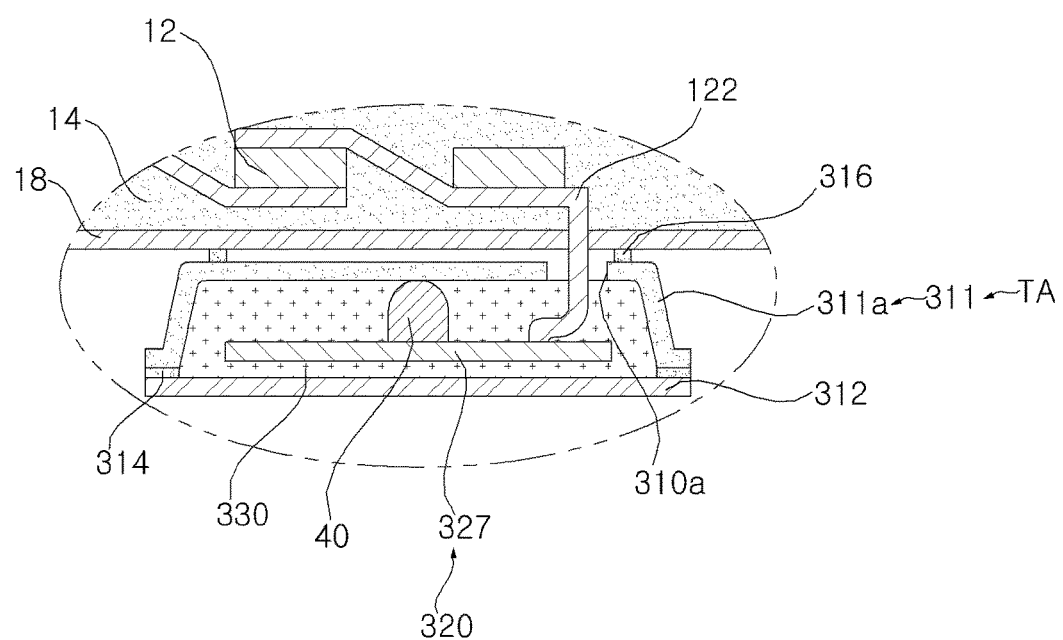
FIG. 9 is a partial cross-sectional view illustrating a solar cell module in accordance with a further embodiment of the present invention.

FIG. 9 is a partial cross-sectional view illustrating a solar cell module in accordance with a further embodiment of the present invention. For reference, FIG. 9 illustrates a portion corresponding to the enlarged circle of FIG. 2.

With reference to FIG. 9, in this embodiment, a part of a case 310 located between a light source 40 and a solar cell panel 10 may be provided as a light transmitting part 311a formed of a light transmitting material (for example, a transparent or translucent resin). At least a part of the case 310 having a light transmitting property may constitute a light transmitting area TA. Therefore, a separate light transmitting hole (310c of FIG. 2) and/or a light transmitting material (318 of FIG. 2) are not provided. Here, although FIG. 9 exemplarily illustrates the entirety of a first case part 311 as constituting the light transmitting part 311a, the present invention is not limited thereto.

Figure 10:
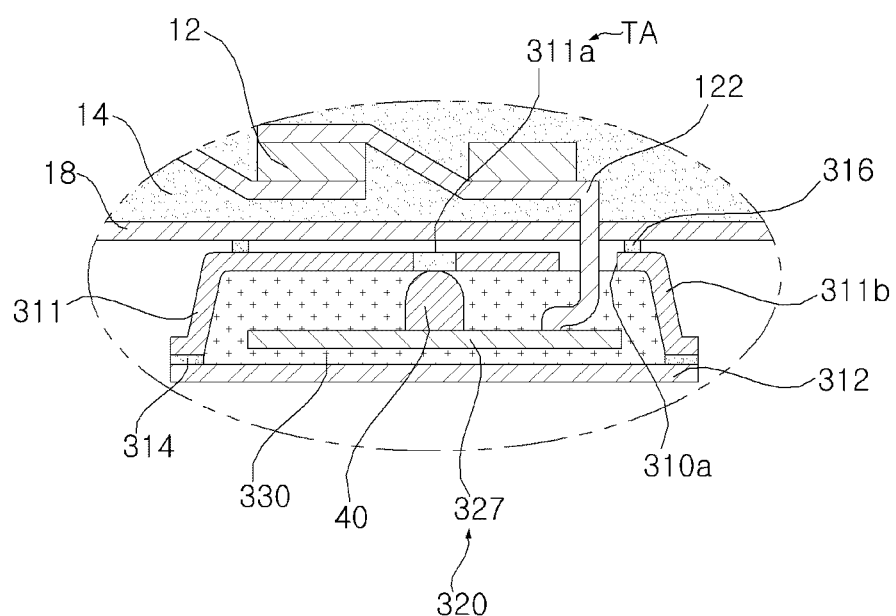
FIG. 10 is a partial cross-sectional view illustrating a solar cell module in accordance with another embodiment of the present invention.

Therefore, as exemplarily shown in FIG. 10, a light transmitting part 311a having a light transmitting property may be located only at a portion of a first case part 311 corresponding to the position of a light source 40 so as to form a light transmitting area TA, and other portions of the first case part 311 may form a light non-transmitting part 311b. Otherwise, the bottom surface of the first case part 311 contacting the rear surface of the solar cell panel 10 may form a light transmitting part 311a, and the side surfaces of the first case part 311 and parts of the first case part 311 contacting a second case part 312 may form a light non-transmitting part 311b. Further, at least a portion of the second case part 312 as well as the first case part 311 may include a light transmitting part. That is, in this embodiment, a part of at least the surface of a distribution box 30 facing the solar cell panel 10 (in more detail, a part of the case 310), which corresponds to the light source 40, may constitute a light transmitting part 311a having a light transmitting property.

FIGS. 9 and 10 exemplarily illustrate the light source 40 as contacting the light transmitting part 311a of the first case part 311 such that only the light transmitting part 311a is located between the light source 40 and the solar cell panel 10. However, the present invention is not limited thereto and the light source 40 may be spaced from the light transmitting part 311a and a potting member 330 or a vacant space having a light transmitting property may be located between the light source 40 and the light transmitting part 311a. In this case, the potting member 330 or the vacant space having a light transmitting property, located between the light source 40 and the light transmitting part 311a, may constitute a portion of a light transmitting area TA.

Figure 11:
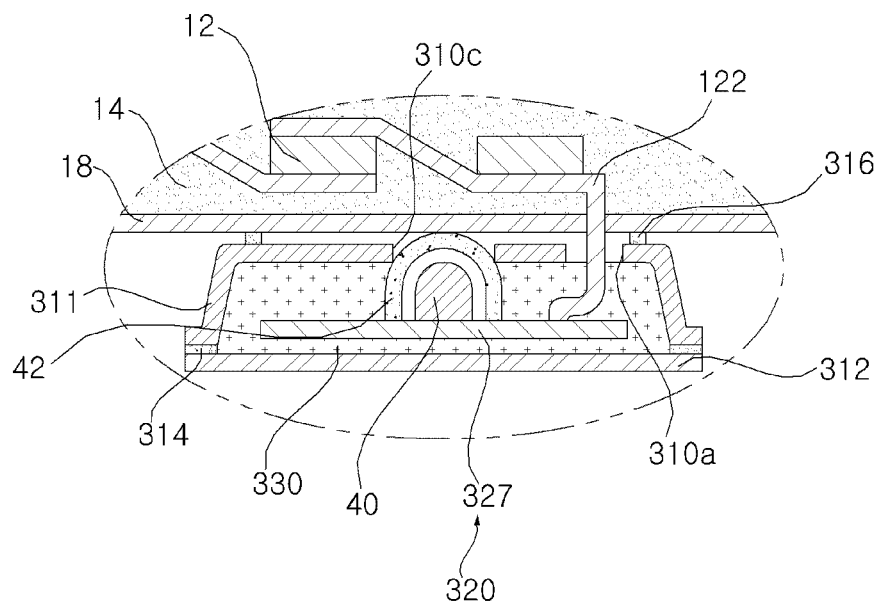
FIG. 11 is a partial cross-sectional view illustrating a solar cell module in accordance with another embodiment of the present invention.

FIG. 11 is a partial cross-sectional view illustrating a solar cell module in accordance with another embodiment of the present invention. For reference, FIG. 11 illustrates a portion corresponding to the enlarged circle of FIG. 2.

With reference to FIG. 11, in this embodiment, a cover 42 covering a light source 40 and having a light transmitting property may be located between the light source 40 and a solar cell panel 10. The cover 42 may be a light transmitting structure having a convex shape towards the solar cell panel 10 so as to cover the light source 40 and, for example, be formed of a transparent or translucent resin. If such a cover 42 is provided, the cover 42 covering the light source 40 may easily constitute a light transmitting area TA.

As one example, the cover 42 may pass through a through hole 310c of a first case part 311 and contact a rear substrate 18 of the solar cell panel 10. Here, the cover 42 may be interference-fitted to the through hole 310c so as to fill the entire through hole 310c. Thereby, the cover 42 may be structurally stably fixed and protect the light source 40.

However, the present invention is not limited thereto. As another example, the first case part 311 may be provided with a light transmitting part (311a of FIG. 9 or 10) without the through hole 310c and the cover 42 may be located within the case 310. Here, the cover 42 may contact the first case part 311, or a potting member 330 or a vacant space having a light transmitting property may be located between the cover 42 and the first case part 311.

Figure 12:
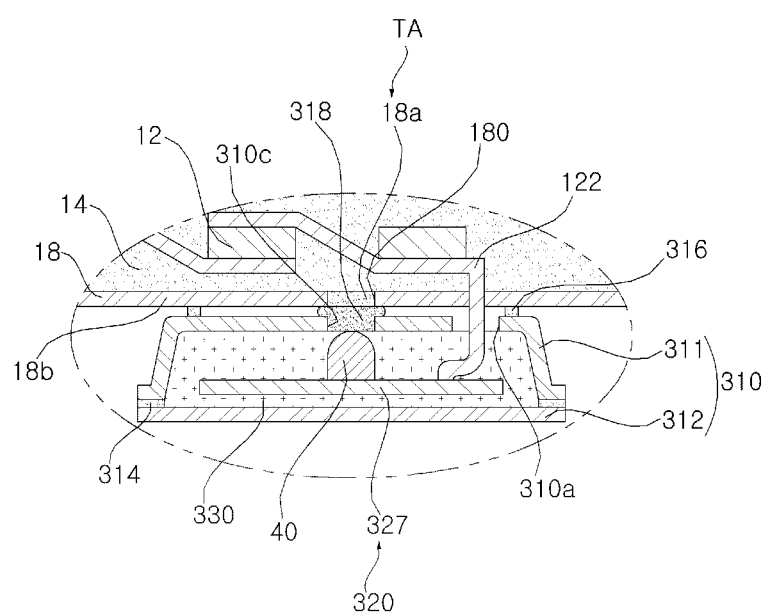
FIG. 12 is a partial cross-sectional view illustrating a solar cell module in accordance with another embodiment of the present invention.

FIG. 12 is a partial cross-sectional view illustrating a solar cell module in accordance with another embodiment of the present invention. For reference, FIG. 12 illustrates a portion corresponding to the enlarged circle of FIG. 2.

With reference to FIG. 12, in this embodiment, at least a part of a rear substrate 18 opposite a part of a distribution box 30 corresponding to a light source 40 constitutes a light transmitting part 18a. A front substrate 10 and sealing layers 14 of a solar cell panel 10 are formed of a light transmitting material. Further, the light source 40 is located at a position corresponding to an outer area OA which is not shielded by solar cells 12. Therefore, the front substrate 10, the solar cells 12 and the sealing layers 14 do not shield light emitted from the light source 40.

If the entirety of the rear substrate 18 has a light transmitting property, the rear substrate 18 does not shield light emitted from the light source. On the other hand, as needed, the rear substrate 18 may include a light non-transmitting part 18b formed of a reflective sheet to improve reflection characteristics of the solar cell panel 10 or a dark-colored sheet or a black sheet to improve the external appearance of the solar cell panel 10. In this case, light emitted from the light source may be obstructed by the rear substrate 18 and thus the light transmitting part 18a is located at a position of the rear substrate 18 corresponding to the light source 40 (i.e., a part of the outer area OA).

Here, as exemplarily shown in FIG. 12, the light transmitting part 18a may be formed by forming a through hole 180 on the rear substrate 18, throughout which the light non-transmitting part 18b is provided. If the light transmitting part 18a is formed by the through hole 180, the light transmitting part 18a may be formed by a simple process.

Figure 13:
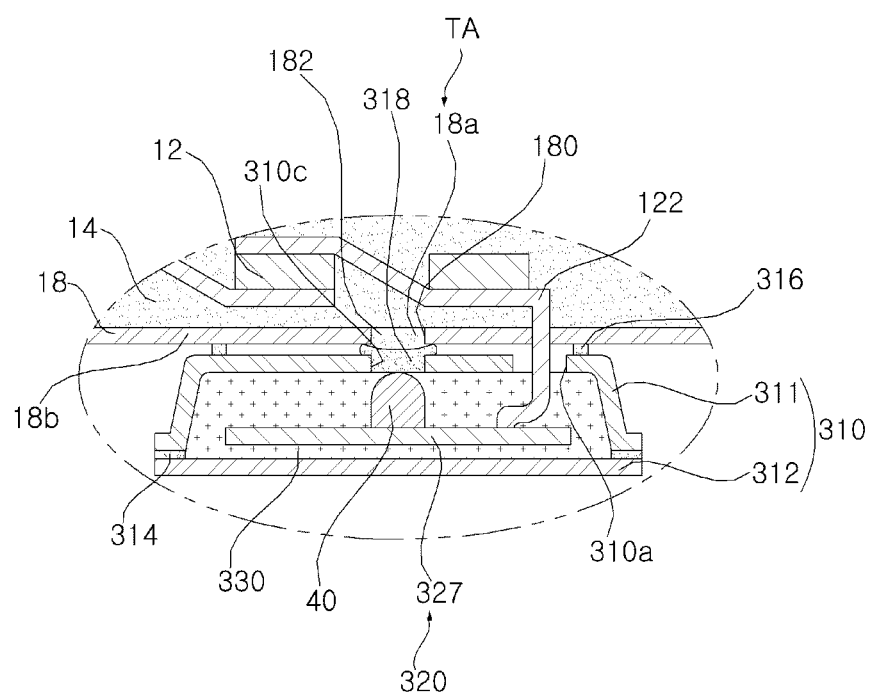
FIG. 13 is a partial cross-sectional view illustrating a solar cell module in accordance with another embodiment of the present invention.

Otherwise, as exemplarily shown in FIG. 13, a light non-transmitting part 18b may be formed by forming a through hole 180 on a rear substrate 18 throughout which a light non-transmitting part 18b is provided, or by filling the through hole 180 with a light transmitting material 182 (for example, a transparent or translucent resin). As one example, the through hole 180 may be filled through printing, etc. Otherwise, the light transmitting part 18a may be manufactured using a transparent or translucent resin together with manufacture of the light non-transmitting part 18b during a process of manufacturing the rear substrate 18. Thereby, the rear substrate 180 is manufactured without a vacant space and thus effects of the rear substrate 180 may be maximized.

FIGS. 12 and 13 exemplarily illustrate that the through hole 310c corresponding to the light source 40 is formed and the light-emitting material 318 is provided. However, the present invention is not limited thereto and the through hole 310c and/or the light transmitting material 318 may not be provided.

Next, with reference to FIGS. 14 to 17, a solar cell module in accordance with yet another embodiment of the present invention will be described.

Figure 14:
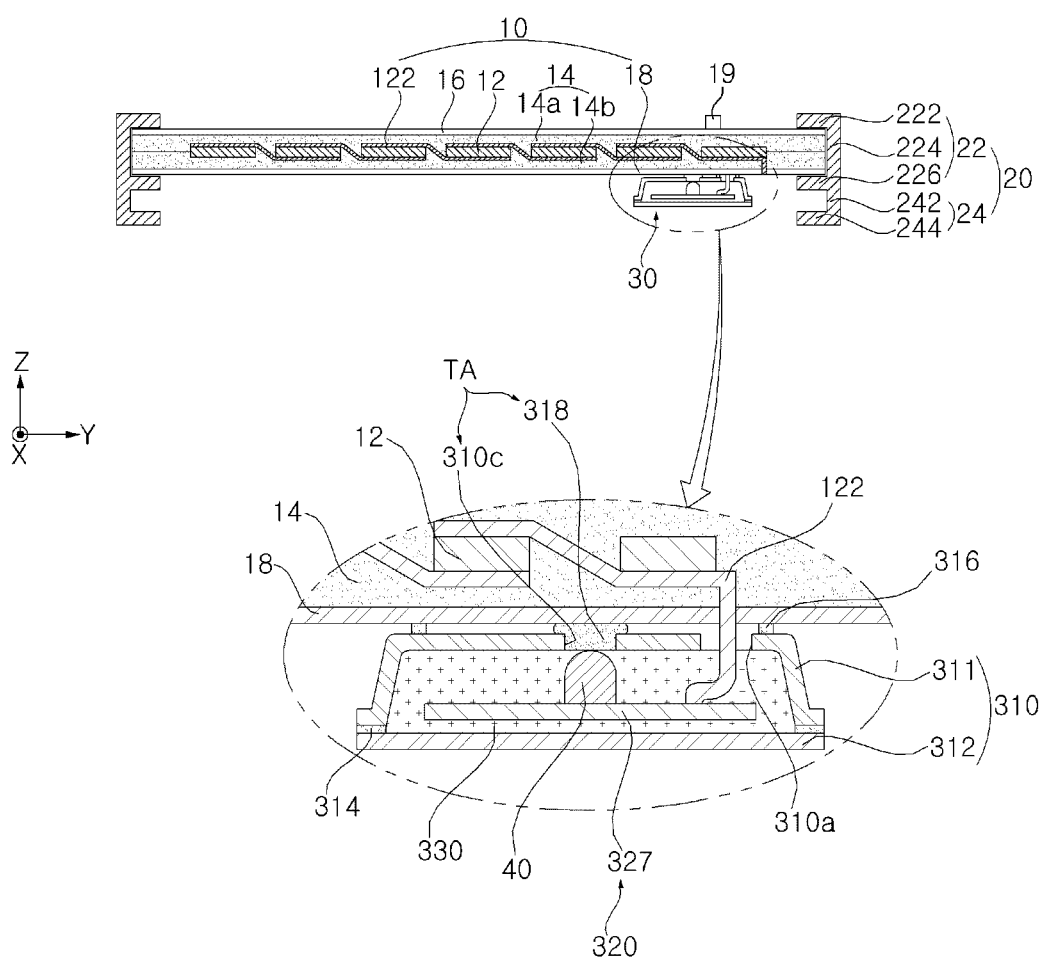
FIG. 14 is a schematic cross-sectional view illustrating a solar cell module in accordance with yet another embodiment of the present invention.
Figure 15:
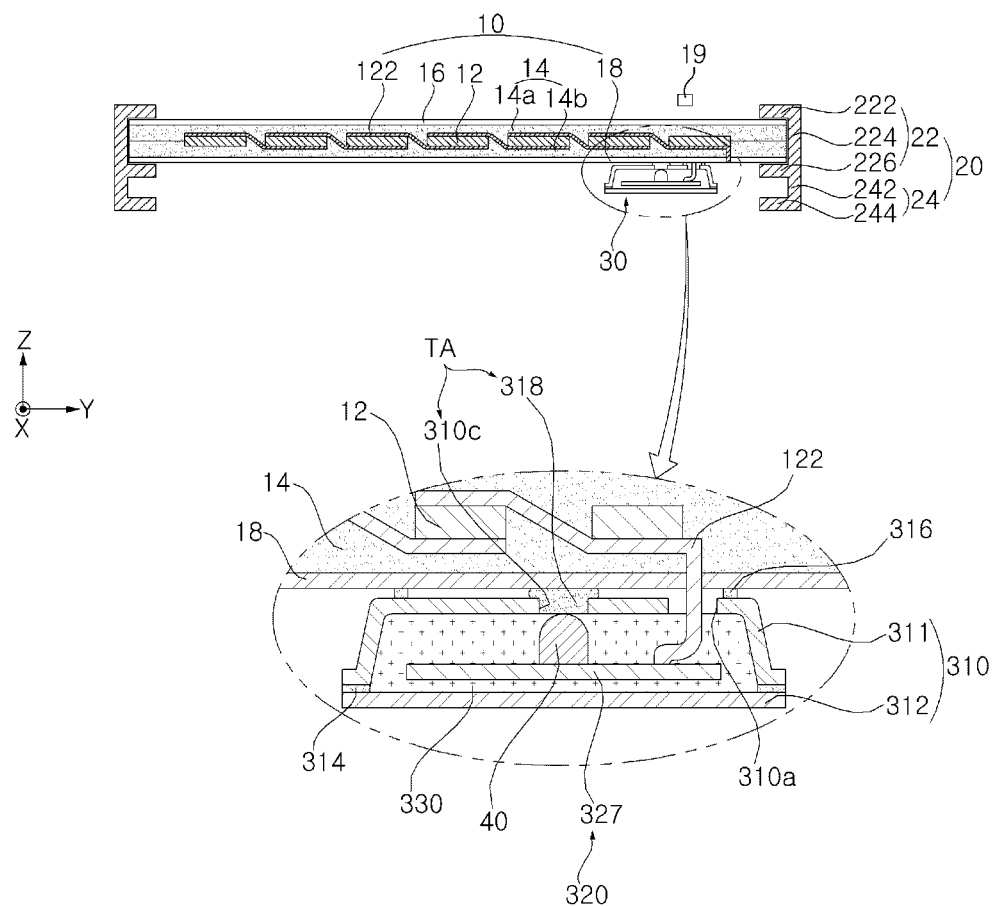
FIG. 15 is a schematic cross-sectional view illustrating a solar cell module in accordance with yet another embodiment of the present invention.
Figure 16:
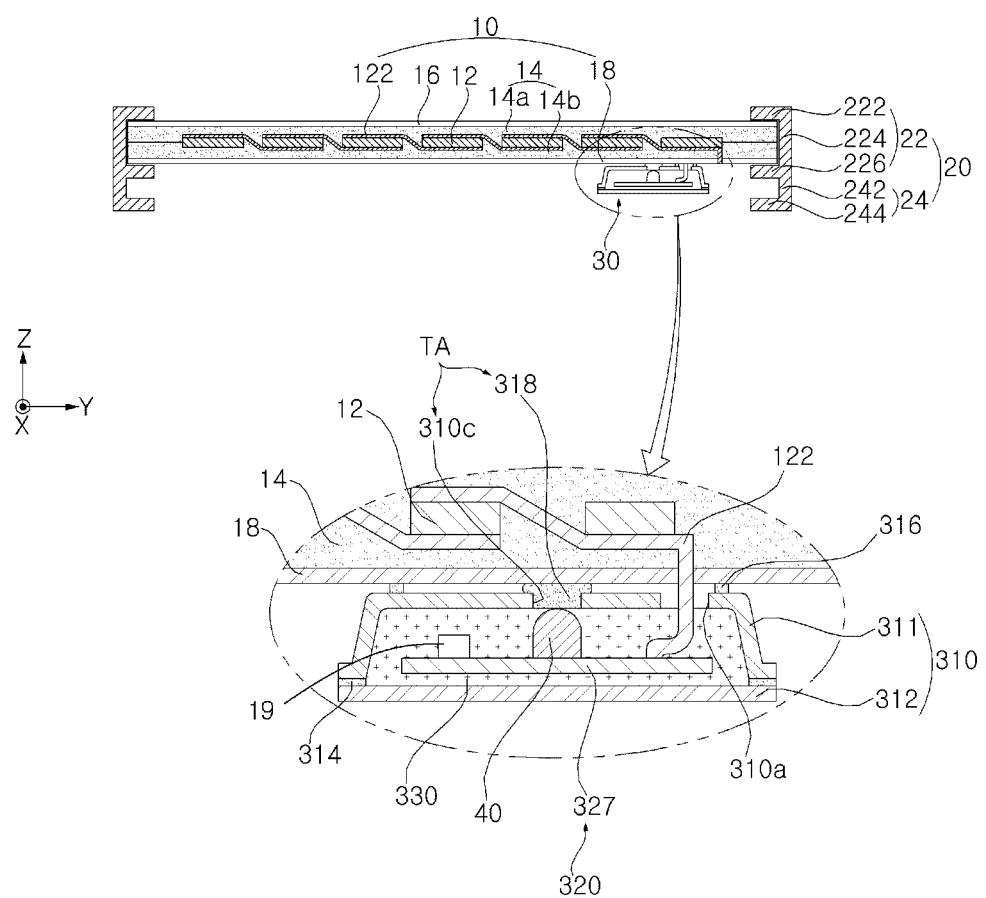
FIG. 16 is a schematic cross-sectional view illustrating a solar cell module in accordance with yet another embodiment of the present invention.
Figure 17:
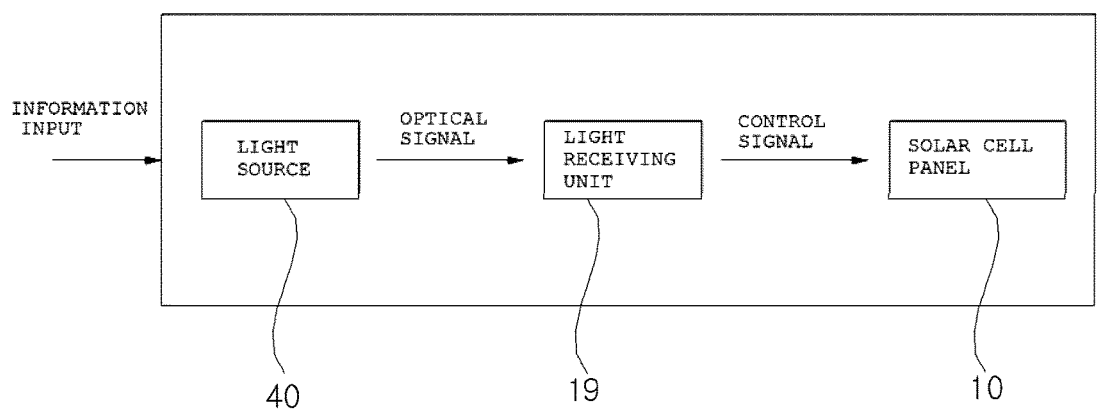
FIG. 17 is a block diagram illustrating operation of the solar cell module shown in FIGS. 14 to 16.

FIGS. 14 to 16 are schematic cross-sectional views illustrating a solar cell module in accordance with yet another embodiment of the present invention, and FIG. 17 is a block diagram illustrating operation of the solar cell module shown in FIGS. 14 to 16.

The solar cell module in accordance with this embodiment is substantially the same as the solar cell module in accordance with the former embodiment shown in FIGS. 1 to 3 except that the solar cell module in accordance with this embodiment further includes a light receiving unit. Therefore, some parts, in this embodiment which are substantially the same as those in the former embodiment, are denoted by the same reference numerals even though they are depicted in different drawings and a detailed description thereof will thus be omitted because it is considered to be unnecessary.

With reference to FIGS. 14 to 16, a solar cell module 100 in accordance with this embodiment includes a solar cell panel 10 including solar cells 12, and a distribution box 30 mounted on the solar cell panel 10 and connected to the solar cell panel 10. The solar cell module 100 may further include a frame 20 to fix the edge portion of the solar cell panel 10 and an adhesive member located between the solar cell panel 10 and the frame 20 to seal the solar cell panel 10 and the frame 20 and to adhere the solar cell panel 10 and the frame 20 to each other.

The solar cell panel 10 includes at least one solar cell 12. Further, the solar cell panel 10 may include sealing layers 14 to surround and seal the solar cells 12, a front substrate 16 disposed on one surface of the sealing layers 14 above the front surfaces of the solar cells 12, and a rear substrate 18 disposed on the other surface of the sealing layers 14 below the rear surfaces of the solar cells 12.

Further, the solar cell panel 10 includes a light receiving unit 19 disposed on the front substrate 16. The light receiving unit 19 may configured to electrically connect to the distribution box 30 or may be formed directly on the distribution box 30. For example, the light receiving unit 19 (19 of FIG. 16) may be positioned next to the light source 40, the LED of the distribution box 30. The light receiving unit 19 may be connected to the solar cell panel 10 so as to transmit/receive an electrical signal with the solar cell panel 10. That is, the light receiving unit 19 may receive an optical signal from the light source 40 and control the solar cell panel 10 through the received optical signal.

The solar cell panel 10 may be controlled by a control signal by the light receiving unit 19. That is, the light receiving unit 19 may receive the optical signal from the light source (not shown) comprising a control unit (not shown) of the external, and controlling the solar cell panel 10 by using the received optical signal. That is, a user may cause the light source (not shown) to generate a specific optical signal using a control signal of an input device, such as a terminal. Here, the specific optical signal may include system information, such as proper voltage, a frequency of current, etc. of the solar cell panel 10, information necessary for array building, or other control signals.

The optical receiving unit 19 may receive the specific optical signal including such information or a control signal and then control the solar cell panel 10 based on the received specific optical signal.

With reference to FIG. 15, when input of information through an external terminal is executed, an optical signal may transmit from the light source 40 to the light receiving unit 19, and the light receiving unit 19 having received the optical signal may receive a a control signal according to the received optical signal, and the control signal may control aa output signal of the solar cell panel 10.

As apparent from the above description, in a solar cell module in accordance with one embodiment of the present invention, a user or a manager may visually recognize light emitted from a light source and reaching the front surface of a solar cell panel via the solar cell panel and thus an abnormality or an operation error of the solar cell module may be sensed. Otherwise, an abnormality or an operation error of the solar cell module may be sensed using a separate error detector, which senses light reaching the front surface of the solar cell panel. Since the solar cell module may autonomously recognize an error signal thereof, an error of the solar cell module may be easily sensed and thus necessary measures may be taken. Therefore, management of the solar cell module may be more efficiently carried out.

Here, if the error detector for solar cell modules is used, the detailed state of the solar cell module depending on minute differences between on/off of the light source, the frequencies of lighting of the light source, the lighting time intervals of the light source, the colors of light emitted from the light source and/or the intensities of light emitted from the light source may be clearly recognized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A solar cell module comprising:
    a solar cell panel;
    a distribution box located on the rear surface of the solar cell panel and including wiring connected to the solar cell panel; and
    a light source configured to emit light to a front surface of the solar cell panel through the solar cell panel, the light source being located at a portion at the distribution box,
    wherein a bottom surface of the distribution box contacts a rear surface of the solar cell panel, and
    wherein the light source located in the distribution box is placed facing the front surface of the solar cell panel through an opening of the bottom surface of the distribution box.

2. The solar cell module according to claim 1, wherein at least a part of the distribution box located between the solar cell panel and the light source constitutes a light transmitting area.

3. The solar cell module according to claim 1, wherein:
    the distribution box includes a case provided with a receipt space formed therein; and
    at least a part of the light source is located within the case.

4. The solar cell module according to claim 3, wherein:
    the distribution box includes a circuit unit including the wiring and located within the case; and
    the light source is fixed to the circuit unit.

5. The solar cell module according to claim 4, wherein:
    the circuit unit includes a printed circuit board; and
    the light source is fixed to the printed circuit board.

6. The solar cell module according to claim 5, wherein the light source is located on a surface of the printed circuit board facing the solar cell panel.

7. The solar cell module according to claim 3, wherein a through hole is formed at a part of the case, located between the light source and the solar cell panel, corresponding to the position of the light source.

8. The solar cell module according to claim 7, wherein the through hole is filled with a light transmitting material.

9. The solar cell module according to claim 7, further comprising ribbons extending from the solar cell panel, wherein:
    a first opening to pass the ribbons therethrough is formed in the distribution box; and
    the first opening and the through hole are separately formed.

10. The solar cell module according to claim 3, wherein at least a portion of a part of the distribution box located adjacent to the solar cell panel, corresponding to the position of the light source, forms a light transmitting part.

11. The solar cell module according to claim 1, wherein:
    the solar cell panel includes a front substrate, solar cells, a rear substrate and sealing layers; and
    at least a part of the rear substrate corresponding to the position of the light source includes a light transmitting part.

12. The solar cell module according to claim 11, wherein the light transmitting part of the rear substrate includes a through hole or a light transmitting material.

13. The solar cell module according to claim 5, wherein the circuit unit includes inverter members, and a controller configured to receive state information of the inverter members and to control the inverter members and the light source,
    wherein the controller controls on/off of the light source if an error signal of the inverter members is detected.

14. The solar cell module according to claim 1, wherein:
    the solar cell panel includes an outer area provided with no solar cells; and
    light emitted from the light source is transmitted to the front surface of the solar cell panel through the outer area.

15. The solar cell module according to claim 14, wherein the light source is located at a position corresponding to the outer area.

16. The solar cell module according to claim 14, wherein:
    the solar cells include a plurality of solar cells; and
    the light source is located at a position corresponding to a part of the outer area located between neighboring solar cells.

17. The solar cell module according to claim 1, wherein the light source emits light, if at least one of cases that a frequency of AC current output from inverter members is more rapidly changed than a set reference, that leakage current is higher than a set reference, that AC current output from the inverter members is higher than a set reference, that DC current input to the inverter members is higher than a set reference, that communication of a communication unit is not stable, that the inverter members are not operated, that the temperature of the inverter members is higher than a set reference, that AC voltage output from the inverter members is higher or lower than a set reference, that a frequency of AC current output from the inverter members is higher or lower than a set reference, and that DC voltage input to the inverter members is higher or lower than a set reference, is satisfied.

18. The solar cell module according to claim 1, further comprising:
   a transparent outer area disposed between two adjacent solar cells in the solar panel,
   wherein the light source is further configured to emit the light through a backside of the solar panel and out a front side of the solar panel, via the transparent outer area.

* * * * *